(12) United States Patent
Luttmann et al.

(10) Patent No.: US 8,819,811 B1
(45) Date of Patent: *Aug. 26, 2014

(54) USB SECURE STORAGE APPARATUS AND METHOD

(75) Inventors: Eric Luttmann, Eagle, ID (US); Jeff Miller, Eagle, ID (US)

(73) Assignee: Cypress Semiconductor Corporation, San Jose, CA (US)

( * ) Notice: Subject to any disclaimer, the term of this patent is extended or adjusted under 35 U.S.C. 154(b) by 922 days.

This patent is subject to a terminal disclaimer.

(21) Appl. No.: 12/754,580

(22) Filed: Apr. 5, 2010

Related U.S. Application Data

(63) Continuation of application No. 11/060,451, filed on Feb. 16, 2005, now Pat. No. 7,721,115.

(51) Int. Cl.
| | |
|---|---|
| *G06F 7/04* | (2006.01) |
| *G06F 12/00* | (2006.01) |
| *G06F 12/14* | (2006.01) |
| *G06F 13/00* | (2006.01) |
| *G06F 17/30* | (2006.01) |
| *G11C 7/00* | (2006.01) |

(52) U.S. Cl.
USPC .......................................... 726/19; 713/185

(58) Field of Classification Search
USPC ....................................................... 726/9, 19
See application file for complete search history.

(56) References Cited

U.S. PATENT DOCUMENTS

| | | | |
|---|---|---|---|
| 4,829,169 A * | 5/1989 | Watanabe | ..................... 235/492 |
| 5,966,705 A | 10/1999 | Koneru et al. | |
| 6,148,384 A * | 11/2000 | Devanagundy et al. | ...... 711/163 |
| 6,202,153 B1 | 3/2001 | Diamant et al. | |
| 6,567,889 B1 | 5/2003 | DeKoning et al. | |
| 6,968,454 B2 | 11/2005 | Master et al. | |
| 7,103,780 B1 | 9/2006 | Brieussel | |
| 7,237,046 B2 | 6/2007 | Paley et al. | |
| 7,278,025 B2 | 10/2007 | Saito et al. | |
| 7,303,120 B2 | 12/2007 | Beenau et al. | |
| 7,392,358 B2 | 6/2008 | Chen et al. | |
| 7,437,574 B2 | 10/2008 | Ronkka et al. | |
| 7,454,615 B2 | 11/2008 | O'Neil et al. | |
| 7,478,248 B2 * | 1/2009 | Ziv et al. | ....................... 713/193 |
| 7,606,946 B2 | 10/2009 | Kobayashi et al. | |

(Continued)

FOREIGN PATENT DOCUMENTS

| | | |
|---|---|---|
| EP | 1840783 A2 | 3/2007 |
| JP | 2001051904 A | 2/2001 |

(Continued)

OTHER PUBLICATIONS

Michael Neve; Memories: a Survey of their Secure Uses in Smart Cards; Year: 2004; IEEE; pp. 1-11.*

(Continued)

*Primary Examiner* — Mohammad W Reza
*Assistant Examiner* — Monjour Rahim

(57) ABSTRACT

A secure media device preferably includes a Universal Serial Bus (USB) Mass Storage Class (MSC) interface. A storage media area is also preferably provided. The storage media is preferably divided into a first and second area by arranging the storage media into multiple Logical Units (LUNs). The second area is preferably accessed in a conventional manner using a host USB MSC driver through the USB MSC interface on the storage device. A password dialog application can be located in the second area of the storage device.

20 Claims, 4 Drawing Sheets

(56) References Cited

U.S. PATENT DOCUMENTS

| | | | |
|---|---|---|---|
| 7,721,115 B2 | 5/2010 | Luttmann et al. | |
| 2002/0049911 A1* | 4/2002 | Kamada et al. | 713/200 |
| 2003/0046570 A1 | 3/2003 | Ronkka et al. | |
| 2003/0225971 A1* | 12/2003 | Oishi et al. | 711/115 |
| 2004/0103288 A1 | 5/2004 | Ziv et al. | |
| 2004/0109062 A1* | 6/2004 | Yamaya | 348/207.1 |
| 2004/0123127 A1* | 6/2004 | Teicher et al. | 713/193 |
| 2004/0193744 A1* | 9/2004 | Paley et al. | 710/5 |
| 2004/0225887 A1 | 11/2004 | O'Neil et al. | |
| 2005/0172099 A1* | 8/2005 | Lowe | 711/207 |
| 2006/0143687 A1 | 6/2006 | O'Connor et al. | |
| 2006/0161725 A1* | 7/2006 | Lee et al. | 711/103 |
| 2006/0161749 A1 | 7/2006 | Chen et al. | |
| 2007/0083939 A1 | 4/2007 | Fruhauf et al. | |
| 2007/0210162 A1 | 9/2007 | Keen et al. | |

FOREIGN PATENT DOCUMENTS

| | | |
|---|---|---|
| JP | 2004151785 A | 5/2004 |
| KR | 2004069400 A | 8/2004 |
| KR | 2004096944 A | 11/2004 |

OTHER PUBLICATIONS

USPTO Notice of Allowance for U.S. Appl. No. 11/060,451 dated Dec. 15, 2009; 6 pages.

USPTO Non-Final Rejection for U.S. Appl. No. 11/060,451 dated Jun. 18, 2009; 10 pages.

USPTO Final Rejection for U.S. Appl. No. 11/060,451 dated Jan. 22, 2009; 12 pages.

USPTO Non-Final Rejection for U.S. Appl. No. 11/060,451 dated Jul. 3, 2008; 10 pages.

USPTO Miscellaneous Action with SSP for U.S. Appl. No. 11/060,451 dated Feb. 8, 2006; 1 page.

International Search Report for International Application No. PCT/US20061004069 dated Aug. 22, 2006; 3 pages.

Written Opinion of the International Searching Authority for International Application No. PCT/US2006/004069 dated Aug. 22, 2006; 3 pages.

"AT Attachment with Packet Interface-6 (ATA/ATAPI-6)," American National Standard for Information Systems, T13 Reflector, Mar. 2001, Revision 1b, pp. 1-470; 476 pages.

"JumpDrive Secure USB Flash Drive," Lexar Media, Inc. website (www.lexar.com/jumpdrive/jd_secure.html), dated Jun. 21, 2005, pp. 1-6; 7 pages.

"Flash Drive Crypto v1.5," ADVS Technologies website (www.flashcrypto.com), Version 1.5, dated Jun. 21, 2005 pp. 1-2; 2 pages.

"TurboCrypt Disk Encryption Software," PMC Ciphers website (www.pmc-ciphers.com/prodcuts/index.php), dated Jun. 21, 2005, pp. 1-2; 2 pages.

"A Structured Approach to Hard Disk Encryption," Gentoo Technologies website (www.sdc.org/~leila/usb-dongle/readme.html), dated Jun. 21, 2005, pp. 1-24; 25 pages.

"PMC Ciphers, Inc. BPP Disk Ultra-Secure File-, Volume-and NTFS Partition Encryption," PMC Ciphers website (www.ciphers.de/downloads/bpp_disk_white_paper_en.pdf), published Dec. 2002, revised Jan. 2004, pp. 1-5; 6 pages.

"StorageCrypt2," Magiclab Software website (www.magic2003.net/scrypt/index.htm), dated Jun. 21, 2005, pp. 1-6; 7 pages.

ADVS Technologies website (www.flashcrypto.com), "Flash Drive Crypto v1.5," pp. 1-2.

Gentoo Technologies website (www.sdc.org/about.leila/usb-dongle/readme.html), "A Structured Approach to Hard Disk Encryption," pp. 1-18.

Japanese Office Action for Application No. 2007-556174 dated Jun. 5, 2012; 2 pages.

Lexar Media, Inc. website (www.lexarcom/jumpdrive/jd.sub.--secure.html), "JumpDrive Secure USB Flash Drive," pp. 1-8.

Magiclab Software website(www.magic2003.net/scrypt/index.htm), "StorageCrypt2," pp. 1-6.

PMC Ciphers website (www.ciphers.de/downloads/bpp_disk_white_paper_en.pdf), "PMC Ciphers, Inc. BPP Disk Ultra-secure File-, Volume- and NTFS Partition Encryption," pp. 1-5.

PMC Ciphers website (www.pmc-ciphers.com/products/index.php), "TurboCrypt Disk Encryption Software," pp. 1-2.

Japanese Office Action for Application No. 2007-556174 dated May 17, 2011; 2 pages.

Taiwanese Office Action for Application No. 95104711.0 dated Jan. 12, 2011; 7 pages.

* cited by examiner

USB SECURE STORAGE APPARATUS AND METHOD

CROSS-REFERENCE TO RELATED APPLICATIONS

This application is a continuation of U.S. application Ser. No. 11/060,451, filed Feb. 16, 2005, now U.S. Pat. No. 7,721,115, issued May 18, 2010.

BACKGROUND OF THE INVENTION

1. Field of the Invention

The present invention relates to an apparatus and method of providing a secure area on a media storage device, and more particularly an apparatus and method of providing a storage device with a secure section that does not require custom drivers or a specialized software package for accessing data in the secure section.

2. Description of Related Art

Although conventional technologies provide secure storage areas, these have several disadvantages. One technology uses a software package to create two partitions, a public partition that anyone can access and an encrypted partition that requires installation of specialized drivers and software for accessing the files on the encrypted partition. Another technology, such as is implemented in the USB MSC drivers supplied by Cypress Semiconductor Corporation, uses a custom driver and software application to implement the ATA Security Feature of hard drives to protect access to the entire device using a password that is stored on the hard drive itself.

Unfortunately, there are disadvantages with each of these conventional methods. For example, the technology that provides multiple partitions with one partition being encrypted requires specialized software and drivers to be installed to access files on the encrypted partition. In addition, the secure data has to be encrypted and decrypted to gain access to the files using the specialized software and drivers. Furthermore, unauthorized users could gain access to the actual data in the encrypted partition using low level disk access (sector read/write), thereby providing them with the opportunity to attempt to decrypt the data on the drive.

The technology that permits an entire disk to be protected via hardware also has disadvantages. For instance, this technology also requires specialized software and drivers to be installed in order to unprotect access to the disk. It further provides an all or nothing approach to accessing files on disk, with no separate public and secure areas. Furthermore, the hard drives have to support the ATA security feature for this method to work, and it is therefore not compatible with typical flash memory or ATAPI devices. In addition, once the hard drive is unprotected, a non-standard mechanism is required to cause the Operating System (OS) file system to re-mount the media and access the drive contents.

SUMMARY OF THE INVENTION

According to one preferred embodiment of the present invention, a method is provided that allows portions of a Universal Serial Bus (USB) media device to be secure, and further allows either the presence or absence of unsecured portions. In this preferred embodiment, existing native USB Mass Storage Class (MSC) drivers can be utilized without requiring any custom drivers or software packages to be installed in order to access the secure area on the media.

A preferred apparatus according to this invention is preferably constructed to include specialized firmware in the USB storage device. A simple, standalone security application is also preferably provided to communicate directly with the USB storage device firmware through a standard Human Interface Device (HID) interface. Security requests are preferably executed through the HID interface.

Enabling and disabling access to the secure media is preferably done in the firmware by emulating the insertion and removal of media, respectively. Security features, like locking and unlocking the secure media, would therefore preferably be initiated via the simple, standalone security application. The security application would send the enable or disable instruction through the HID interface to the USB storage device. According to this embodiment, therefore, there would be no need for a custom driver or software package to be installed to allow access to the data contained in the secure media area.

BRIEF DESCRIPTION OF THE DRAWINGS

The foregoing and additional aspects and advantages of the present invention will become more readily apparent through the following detailed description of preferred embodiments, made with reference to the attached drawings, in which.

DETAILED DESCRIPTION OF PREFERRED EMBODIMENTS

The principles of the present invention will be described more fully hereinafter with reference to preferred embodiments thereof. It should be noted, however, that these embodiments are provided by way of example, and not by way of limitation, and that the embodiments disclosed herein may be modified in form and detail without departing from the principles and scope of the invention.

Figure 1:
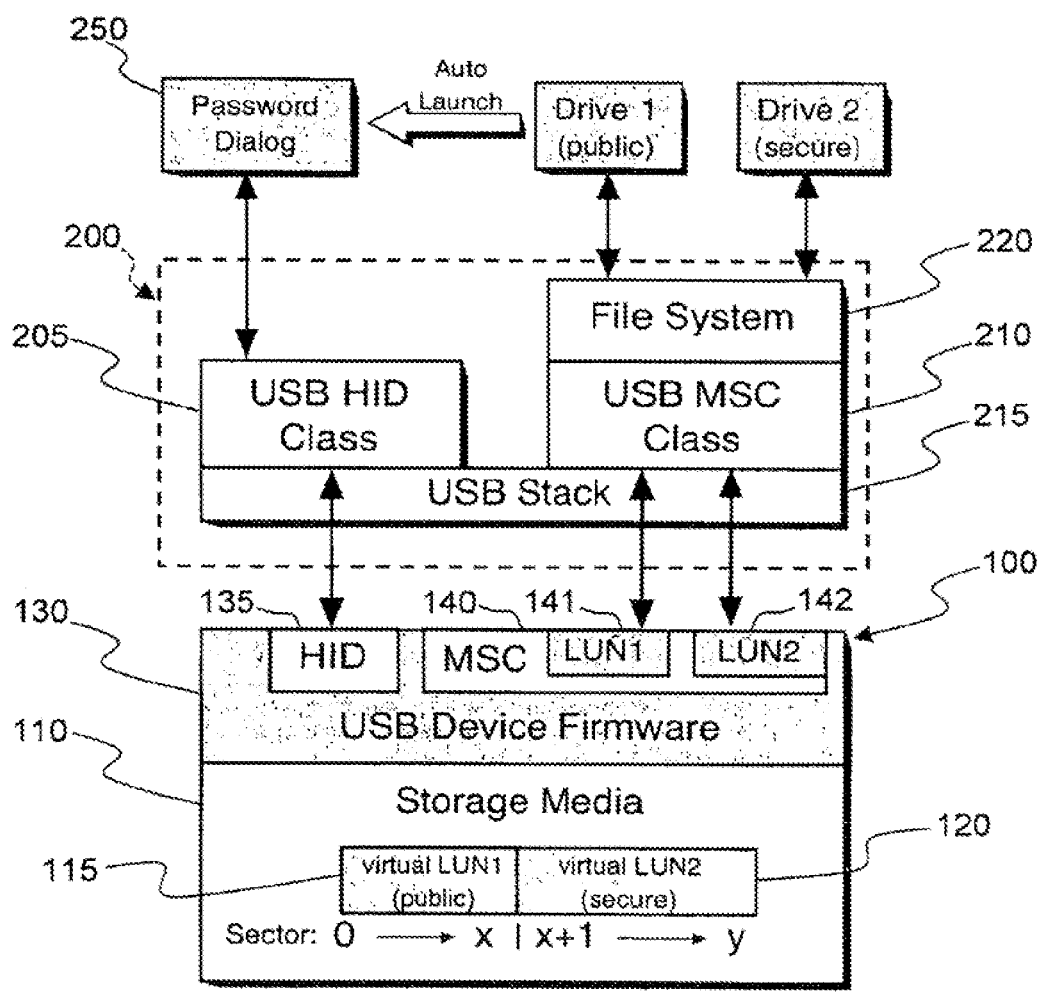
FIG. 1 is a schematic block diagram of a USB secure storage device providing both a secure and a nonsecure section according to a preferred embodiment of the present invention.

As noted previously, FIG. 1 is a schematic block diagram of a USB secure storage device 100 providing both a nonsecure section 115 and a secure section 120 in a storage media area 110, according to a preferred embodiment of the present invention. Referring to FIG. 1, the USB secure storage device 100 includes USB device firmware 130. A host OS 200 preferably includes a USB HID Class driver 205 and a USB MSC driver 210. The host USB MSC driver 210 preferably communicates with a USB MSC interface 140 in the firmware 130 of the USB storage device 100, while the host USB HID Class driver 205 preferably interacts with an HID interface 135 in the firmware 130 of the USB storage device 100. The host OS 200 preferably also includes a USB stack 215 and file system 220 to facilitate communicate between the host OS 200 and the USB storage device 100.

As noted, the USB device firmware 130 preferably includes an HID interface 135 and a MSC interface 140. The MSC interface 140 preferably provides the ability to utilize multiple Logical Units (LUNs) 141, 142 to communicate separately with the secure section 120 and the nonsecure section 115. Most preferably, the size of the nonsecure and secure sections 115, 120 may be user configured by mapping storage areas on the physical media 110 to virtual LUNs corresponding to the secure 120 and nonsecure sections 115.

More particularly, a first physical storage area, including sectors 0–x, is preferably mapped to a first virtual LUN (virtual LUN1) corresponding to the public or nonsecure storage area 115. A second physical storage area, including sectors x+1–y, is preferably mapped to a second virtual LUN (virtual LUN2) corresponding to the secure section 120. The standard USB storage LUN mechanism can then be used to present the nonsecure (public) and secure storage areas 115, 120 to a host device.

First Time Use or Operation Without Security Enabled

First time use of the USB secure storage device 100, or operation without the security feature enabled, is preferably similar to use of conventional USB mass storage devices. In particular, the USB Storage device 100 is preferably USB Mass Storage Class (MSC) compliant. Accordingly, in the configuration described above, the host Operating System (OS) USB MSC driver 210 permits communication with the USB Storage device 100. The USB Storage device 100 preferably provides access to the storage media 110 as a single Logical Unit (LUN). The USB MSC driver 210, in this configuration, mounts and interacts with the media 110 in a conventional manner.

The Secure Storage Feature

The primary difference between the USB secure storage device 100 and a conventional USB MSC device, is that the secure storage device 100 additionally presents an USB HID Class interface 135. The USB HID Class driver 205 provided by the Host OS matches to the HID interface 135 of the storage device 100. The secure section 120 can be protected from unauthorized access using the USB HID interface as will be described in further detail below with reference to FIGS. 1-4.

Figure 2:
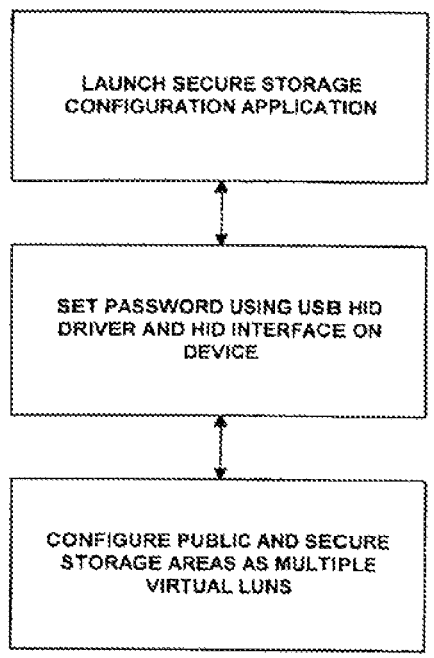
FIG. 2 is a flow diagram illustrating a method of setting up and sectioning the USB secure storage device of FIG. 1 into a secure area and a nonsecure area according to a still further aspect of the present invention.
Figure 3:
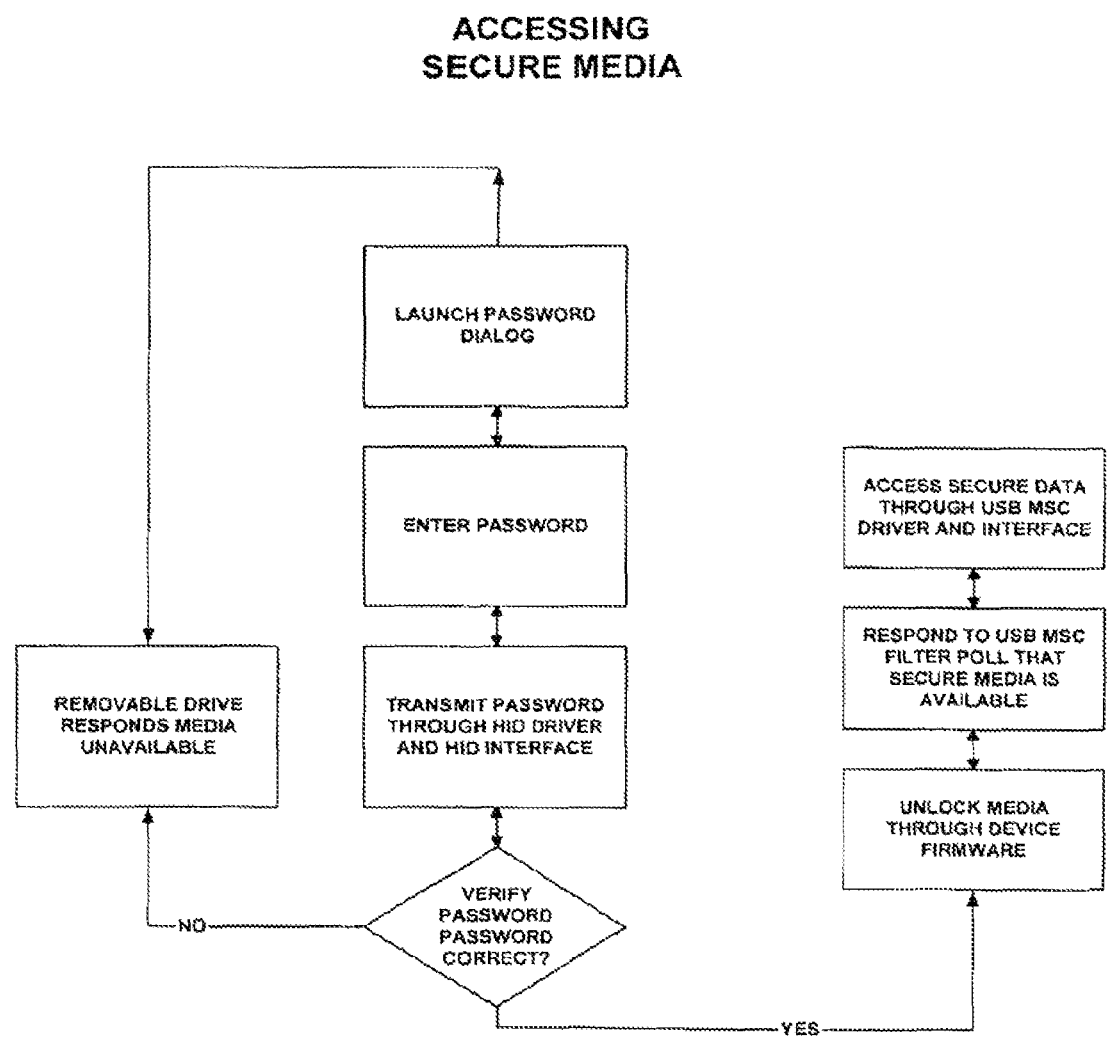
FIG. 3 is a flow diagram illustrating a method of accessing a secure section of the USB secure storage device of FIG. 1 according to another aspect of the present invention.
Figure 4:
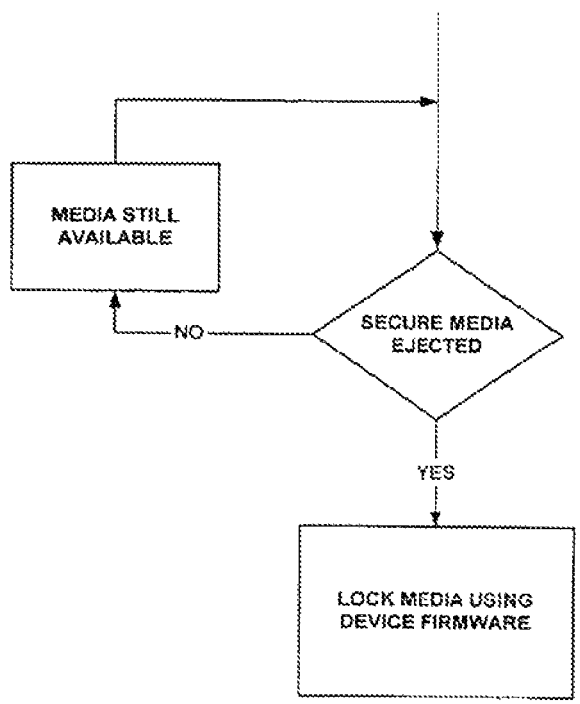
FIG. 4 is a flow diagram illustrating a method of preventing access to a secure section of the USB secure storage device of FIG. 1 according to yet another aspect of the present invention.

FIGS. 2-4 illustrate through flow diagrams preferred methods of configuring and using the secure storage device 100 of FIG. 1. FIG. 2 illustrates a method of setting up and sectioning the USB secure storage device 100 into secure and nonsecure areas. FIG. 3 illustrates a method of accessing a secure section of the USB secure storage device 100. And FIG. 4 illustrates a method of preventing access to a secure section of the USB secure storage device 100.

Enabling and Configuring the Secure Storage Device

Referring specifically to FIGS. 1 and 2, first time setup of the secure storage section 120 is preferably initiated by the end-user. More particularly, a custom secure storage configuration application is preferably launched by the end-user, or can be automatically launched from the USB storage device 100, to create the secure storage section 120. This application preferably communicates with the USB storage device 100 by way of the USB HID driver 205. The application can use the USB HID driver 205 and the USD HID interface 135 of the USB Storage device 100 to send commands to setup the security configuration of the device. This includes setting a security password as well as setting up the size of the public and secured sections 115, 120 of the media 110. The security password can be stored in non-volatile memory such as NV-RAM, EEPROM, or other flash memory, for example, and can be located, for instance, in the secured section 120 of the media 110.

As noted previously, configuration of the public and secured areas 115, 120 preferably takes place by setting them up as multiple virtual LUNs. The public area 115 is preferably defined by mapping a first physical storage area (e.g., sectors 0–x) to a first virtual LUN (virtual LUN1). Likewise, the secure area 120 is preferably defined by mapping a second physical storage area (e.g., sectors x+1–y) to a second virtual LUN (virtual LUN2). The standard USB storage LUN mechanism can then be used to present the nonsecure (public) area 115 and the secure storage areas 120 to a host device in a manner as will be further described below.

Additionally, using the HID Interface 135, later reconfiguration of the secure media area 120 is preferably also able to be performed. This could include, for example, permitting a user to enable and disable the secure media option, permitting a user to define and change the size of public media area 115 and secure media area 120, and allowing a user to change the secure media password. A user could also be allowed to reconfigure the device 100 in case of a lost password, but preferably only after a complete low-level (firmware) wipe of the secure area 120.

Accessing the Secured Media

Referring now to FIGS. 1 and 3, after setting up the secure section 120, the secured USB storage device 100 remains USB MSC compliant. The host OS USB MSC driver 210 therefore matches to the secured USB storage device 100. The USB MSC driver 210 interrogates the secured USB storage device 100. The USB secure storage device 100 reports back to the USB MSC driver 210 that it has multiple removable media drives (representing the nonsecure section 115 and the secure section 120). The USB MSC driver 210 mounts the nonsecure media area 115 in the conventional manner.

Again, the primary difference between the USB secure storage device 100 and conventional USB MSC devices is that the USB secure storage device 100 presents an additional USB HID class interface 135. The USB HID driver 205 provided by the host OS 200 matches to the HID interface 135 of the storage device 100. When the password dialog 250 is launched automatically, or initiated by the end-user, that password application 250 communicates with the USB secure storage device 100 by way of the USB HID driver 205. The dialog preferably uses the USB HID driver 205 and the USB HID interface 135 of the USB Storage device 100 to send the password to unlock the secured "drive" area 120.

The USB secure storage device 100 therefore preferably includes an auto-loading or otherwise easily accessible software application that provides a password dialog to permit access to the secure section 120. In one embodiment, for example, the password dialog application 250 is configured to autorun from the nonsecure section 115 upon insertion of the storage device 100 into the host 200, providing a method to unlock the secure media area 120 without having pre-installed software on the host computer.

Until the password application is run and the appropriate password is entered, when the USB MSC driver 210 polls the secured removable media drive 100, the storage device 100 responds with an indication that the media in the secured drive area 120 is not available. This operation is provided by leveraging the protocol for a Multiple-LUN device with removable media. The USB MSC driver 210 will continue to poll the secure storage device 100 for accessible media and the storage device 100 will continue to respond with an indication that no media is available as long as the secured media section 120 remains password protected.

The firmware 130 acts as a gatekeeper to control access to the media. When the secured area 120 is locked by the firmware 130, it blocks access to the secured area 120 by responding to an access request as if a secured drive had been physically removed. When a correct password has been sent and verified, the secured area 120 is then unlocked. The next time the USB MSC driver 210 polls the secured device 100 for accessible media, the device 100 responds with an indication that the secured media area 120 is now available. The USB MSC driver 210 is then able to mount the secure media area 120 in a conventional manner. Again, the firmware 130 acts as the gatekeeper. Once the correct password is received and the secure media area 120 is unlocked, the firmware 130 allows the host requests to pass through to the secure area 120 of the device 100. For instance, the host 200 queries the secure area 120 as removable media and, once unlocked, receives a reply from the secure area 120, and is then able to mount it. Thus, during locking and unlocking the secure area 120, the firmware 130 doesn't modify the media or the media's response to commands from the host 200. Rather, the firmware 130 preferably either blocks access to the locked media by returning requests without passing them through, or opens the "gate" to permit queries to pass through to the unlocked media.

Blocking Access to the Secured Media

A preferred method of blocking access to the secure media area 120 will now be described in more detail with reference to FIGS. 1 and 4. When the host OS file system 220 ejects the secure media area 120 (or in response to another locking event), the USB device firmware 130 preferably locks the secure media area 120. The secure media area 120 then remains locked until the security application is used to unlock it again. Events causing the firmware 130 to lock access to the secure media area 120 include, for instance, powering up the storage device 100 for the first time, receiving an eject command from the host 200, receiving a lock command from a security application over the HID interface 135, or other selected events. If a user forgets the password, the password could preferably be reset and the media reused, but not until after the firmware 130 completes a low-level wipe of the secured data in the secure media area 120.

This invention provides numerous benefits over conventional secure storage systems. Some of the primary advantages of various aspects of this invention include the provision of hardware level secure access while still using the existing USB Mass Storage Class and File System drivers of current operating systems to access the secure data once unlocked. No specialized software or drivers are therefore required to gain access to the secured files. Furthermore, a standard USB HID interface can be used to implement the security interface with the firmware. Therefore, no custom drivers are required to support the interface that initiates the security features.

According to other aspects of this invention, multiple LUNs can be used to distinguish between the public and secure media areas. By leveraging the characteristics of multiple-LUN devices, access to the secure area can be prevented until an appropriate password has been entered. The removable-media mass storage technique can further be utilized to enable and disable access to the secure media area "on-the-fly." Accordingly, a simple, standalone security application is all that is required to unlock access to the secure media area. Also, no encryption and decryption is required to secure the media and there is no risk of unauthorized low level access to the secure media area data. The data remains unavailable until access to the secure media area is unlocked by the firmware on the USB device itself.

Various preferred aspects and embodiments of this invention have been described above. While the principles of this invention have been shown and described with reference to preferred embodiments thereof, it will be understood by those skilled in the art that various changes in form and details may be made without departing from those principles. The invention should therefore be interpreted to encompass all such variations coming within the spirit and scope of the appended claims.

What is claimed is:

1. A Universal Serial Bus (USB) storage device, comprising:
   a USB Mass Storage Class (MSC) interface configured to communicate with a host device;
   a USB Human Interface Device (HID) interface configured to communicate with the host device; and
   a storage media including both a first area and a second area that are accessible through the USB MSC interface, wherein the USB HID interface is configured to receive commands that define a first portion of the storage media as the first area and define a second portion of the storage media as the second area, and wherein the USB storage device is configured to indicate, when the second area is secured, that the second portion of the storage media is unavailable to the host device.

2. The storage device according to claim 1, wherein the USB HID interface is configured to map the first area and the second area to multiple virtual Logical Units (LUNs), wherein the USB MSC interface is configured to access the first area with one LUN and the second area with another LUN.

3. The storage device according to claim 2, further comprising firmware configured to secure the second area when the USB storage device is unavailable to the host device.

4. The storage device according to claim 2, further comprising a password dialog application stored in the first area of the storage media.

5. The storage device according to claim 4, wherein the password dialog application is configured to auto-run on the host device when the USB storage device is initially connected to the host device.

6. The storage device according to claim 5, wherein the host device is configured to provide a password to the USB HID interface according to the password dialog application auto-running on the host device and wherein the USB HID interface is configured to unsecure the second area to the host device according to the password.

7. The storage device according to claim 4, wherein the password dialog application is configured to verify a password and unsecure the second area using a host USB driver that communicates with the USB storage device.

8. The storage device according to claim 2, wherein the USB storage device is configured to respond to a host USB MSC driver interrogation with an indication that the USB storage device contains both the first area and the second area of the storage media.

9. The storage device according to claim 8, wherein the USB storage device is configured to indicate that the second portion of the storage media is unavailable to the host device in response to a host USB MSC poll by indicating that the virtual LUN, corresponding to the secured second area, is unavailable.

10. A method comprising:
    receiving one or more commands through a Universal Serial Bus (USB) interface;
    configuring a storage media of a USB storage device to include both a first area and a second area according to the one or more commands, wherein the one or more commands define a first portion of the storage media as the first area and define a second portion of the storage media as the second area;

setting a password for accessing the first area of the USB storage device using the USB interface of the USB storage device; and configuring the USB storage device to indicate, when the first area is secured, that the first area is unavailable to a host device.

11. The method of claim 10, wherein the first area is a secure area.

12. The method of claim 10, wherein the second area is a non-secure area.

13. The method of claim 10, further comprising configuring a virtual LUN for each of the first and second areas.

14. The method of claim 10, wherein a password dialog application is stored in the second area of the USB storage device.

15. A method comprising:

indicating to a host device, when a first area of a Universal Serial Bus (USB) storage device is secured, that the first area is unavailable to the host device;

verifying a password using an a USB interface on the USB storage device and a host USB driver, wherein the USB interface is communicatively linked with the host USB driver; and unlocking the first area of the USB storage device in response to verification of the password, wherein the USB storage device includes both the first area and a second area, and wherein the USB interface is configured to receive commands that define a first portion of the USB storage device as the first area and define a second portion of the USB storage device as the second area.

16. The method of claim 14, wherein the USB interface comprises a Mass Storage Class (MSC) interface.

17. The method of claim 16, wherein the USB interface comprises a Mass Storage Class (MSC) driver.

18. The method of claim 17, further comprising responding to a MSC driver poll by indicating that the first area is accessible after the first area is unsecured.

19. The method of claim 18, further comprising accessing data in the first area using the host USB driver and the MSC interface.

20. The method of claim 17, wherein indicating that the first area is unavailable to the host device is performed in response to a MSC driver poll.

* * * * *